(12) United States Patent
Nagahama et al.

(10) Patent No.: US 11,905,340 B2
(45) Date of Patent: Feb. 20, 2024

(54) NANOCELLULOSE AND METHOD FOR PRODUCING THE SAME

(71) Applicant: TOYO SEIKAN GROUP HOLDINGS, LTD., Tokyo (JP)

(72) Inventors: Hideaki Nagahama, Yokohama (JP); Yuuki Kinoshita, Yokohama (JP); Toshiki Yamada, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 17/274,239

(22) PCT Filed: Sep. 5, 2019

(86) PCT No.: PCT/JP2019/035024
§ 371 (c)(1),
(2) Date: Mar. 8, 2021

(87) PCT Pub. No.: WO2020/059525
PCT Pub. Date: Mar. 26, 2020

(65) Prior Publication Data
US 2021/0332154 A1  Oct. 28, 2021

(30) Foreign Application Priority Data
Sep. 21, 2018  (JP) .................. 2018-177610

(51) Int. Cl.
| C08B 15/08 | (2006.01) |
| C08B 15/04 | (2006.01) |
| C08B 15/06 | (2006.01) |
| C08L 1/04 | (2006.01) |
| C08L 79/02 | (2006.01) |
| C08L 101/12 | (2006.01) |
| B82Y 30/00 | (2011.01) |
| B82Y 40/00 | (2011.01) |

(52) U.S. Cl.
CPC .............. *C08B 15/08* (2013.01); *C08B 15/04* (2013.01); *C08B 15/06* (2013.01); *C08L 1/04* (2013.01); *C08L 79/02* (2013.01); *C08L 101/12* (2013.01); *B82Y 30/00* (2013.01); *B82Y 40/00* (2013.01)

(58) Field of Classification Search
CPC .......... C08B 15/04; C08B 15/06; C08B 15/08
See application file for complete search history.

(56) References Cited

U.S. PATENT DOCUMENTS

| 2009/0011033 A1 | 1/2009 | Hauser et al. |
| 2010/0316863 A1 | 12/2010 | Kumamoto et al. |
| 2013/0001477 A1 | 1/2013 | Kimura et al. |
| 2013/0296544 A1 | 11/2013 | Isogai et al. |
| 2014/0238626 A1 | 8/2014 | Tsuji et al. |
| 2014/0249305 A1 | 9/2014 | Tanaka et al. |
| 2016/0115249 A1 | 4/2016 | Noguchi et al. |
| 2016/0333116 A1 | 11/2016 | Nakatani et al. |
| 2019/0085511 A1 | 3/2019 | Shimaoka et al. |

FOREIGN PATENT DOCUMENTS

| CN | 101137675 A | 3/2008 | |
| CN | 102804286 A | 11/2012 | |
| CN | 103797182 A | 5/2014 | |
| CN | 103827146 A | 5/2014 | |
| CN | 105906725 A | 8/2016 | |
| CN | 108219009 A * | 6/2018 | ............. C08B 15/02 |
| CN | 108359017 A * | 8/2018 | .......... B01F 17/0057 |
| CN | 108359017 A | 8/2018 | |
| JP | 2009-57552 A | 3/2009 | |
| JP | 4965528 B2 | 7/2012 | |
| JP | 4998981 B2 | 8/2012 | |
| JP | 2013-253200 A | 12/2013 | |
| JP | 2016-156111 A | 9/2016 | |
| JP | 2017-2231 A | 1/2017 | |
| JP | 2017-57285 A | 3/2017 | |
| JP | 6128212 B2 | 5/2017 | |
| JP | 6582110 B1 | 9/2019 | |

OTHER PUBLICATIONS

Ehman et al ("Design of anticoagulant surfaces based on cellulose nanocrystals", Chem. Commun., 2014, 50, 13070) (Year: 2014).*
"Cellulose Encyclopedia", Edited by the Cellulose Society of Japan, Asakusa Publishing Co., Ltd., Nov. 2000, pp. 131-133.
Hongcai Zhang et al., "Physicochemical characteristics and emulsification properties of cellulose nanocrystals stabilized O/W pickering emulsions with high-OSO3-groups", Food Hydrocolloids, 2019, pp. 267-277, 96.
International Search Report for PCT/JP2019/035024, dated Nov. 12, 2019.
Office Action dated May 7, 2022 issued by the Chinese Patent Office in Chinese Application No. 201980061776.5.
Abou-Zeid et al., "Use of Cellulose and Oxidized Cellulose Nanocrystals from Olive Stones in Chitosan Bionanocomposites", Journal of Nanomaterials, vol. 2015, No. 687490, pp. 1-11, 2015 (12 pages total).
Aguayo et al., "Isolation and Characterization of Cellulose Nanocrystals from Rejected Fibers Originated in the Kraft Pulping Process", Polymers, vol. 10, No. 1145, pp. 1-11, 2018 (11 pages total).

(Continued)

*Primary Examiner* — Leigh C Maier
*Assistant Examiner* — Everett White
(74) *Attorney, Agent, or Firm* — Sughrue Mion, PLLC

(57) ABSTRACT

Nanocellulose containing a sulfuric acid group and/or a sulfo group, each of which is derived from a sulfuric acid treatment, and an anionic functional group derived from a hydrophilization treatment. The total amount of the sulfuric acid group and/or the sulfo group and the anionic functional group is more than 0.1 mmol/g and not more than 4.0 mmol/g. Also disclosed is a product including a mixture containing the nanocellulose and a method for producing the nanocellulose.

7 Claims, 1 Drawing Sheet

(56) References Cited

OTHER PUBLICATIONS

Bondeson et al., "Optimization of the isolation of nanocrystals from microcrystalline cellulose by acid hydrolysis", Cellulose, vol. 13, pp. 171-180, 2006 (10 pages total).
Wang et al., "Approaching zero cellulose loss in cellulose nanocrystal (CNC) production: recovery and characterization of cellulosic solid residues (CSR) and CNC", Cellulose, vol. 19, pp. 2033-2047, 2012 (15 pages total).
Extended European Search Report dated May 19, 2022 from the European Patent Office in EP application No. 19863827.2.

* cited by examiner

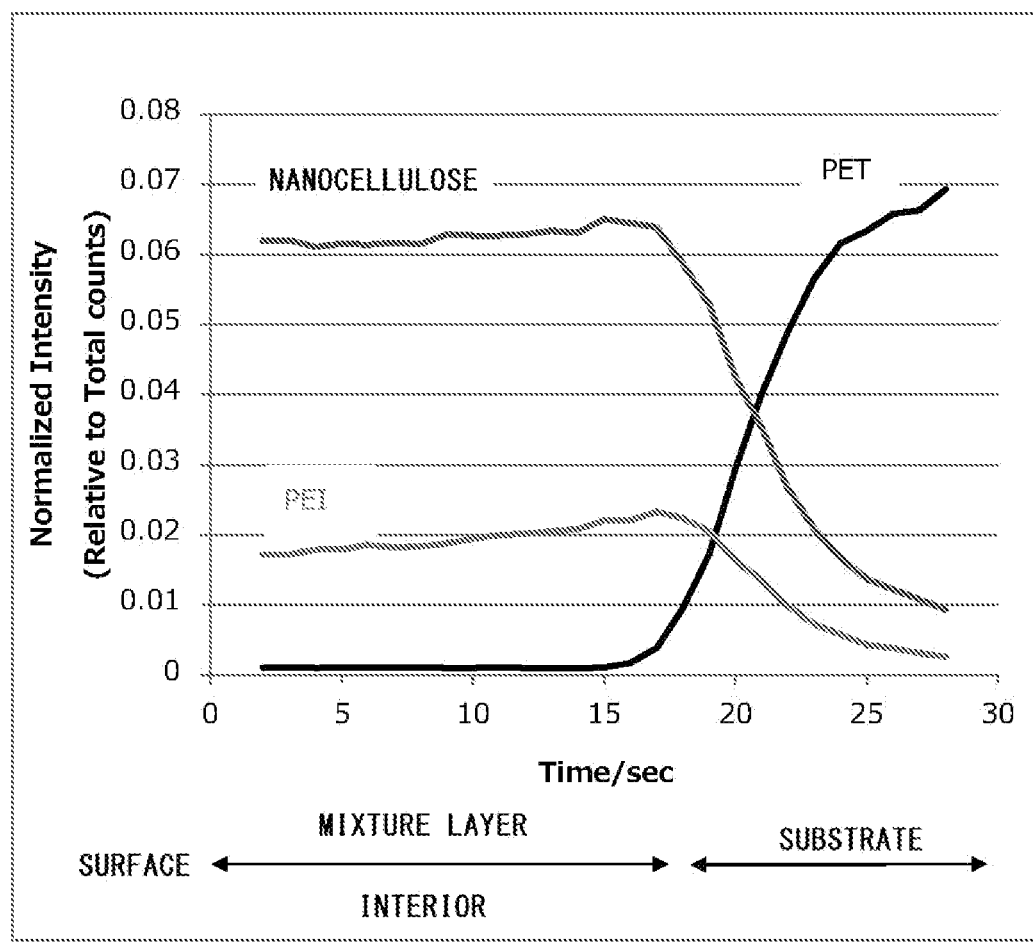

NANOCELLULOSE AND METHOD FOR PRODUCING THE SAME

CROSS REFERENCE TO RELATED APPLICATIONS

This National Stage is a National Stage of International Application No. PCT/JP2019/035024 filed Sep. 5, 2019, claiming priority based on Japanese Patent Application No. 2018-177610 filed Sep. 21, 2018.

TECHNICAL FIELD

The present invention relates to nanocellulose and a method for producing the same. More particularly, the present invention relates to nanocellulose containing anionic functional group and having excellent gas-barrier properties and handleability, and a method for producing the same.

BACKGROUND ART

It has been proposed to use nanocellulose as an advanced biomass feedstock for various applications such as functional additives and film composite materials. In particular, it is known that materials for a film made of cellulose nanofibers or a laminate containing cellulose nanofibers for instance are capable of preventing or reducing dissolution and/or a diffusion of a gas because the materials have hydrogen bonds between the cellulose fibers and strong crosslinking interactions, thereby exhibiting excellent gas-barrier properties like oxygen barrier properties. For this reason, barrier materials comprising the cellulose nanofibers have been proposed.

In order to fibrillate cellulose fibers, a chemical treatment can be conducted in addition to a mechanical treatment. In the chemical treatment, a hydrophilic functional group such as a carboxyl group or a phosphoric acid group is introduced into a hydroxyl group of cellulose, so that energy required for the fibrillation can be reduced and the barrier properties and dispersibility in an aqueous solvent are improved.

For instance, Patent Document 1 below discloses a gas-barrier material containing cellulose fibers having an average fiber diameter of not more than 200 nm. The content of the carboxyl group constituting the cellulose fibers is in the range of 0.4 to 2 mmol/g.

Patent Document 2 below describes fine cellulose fibers having a maximum fiber diameter of not more than 1000 nm and a number average fiber diameter of 2 to 150 nm. The cellulose fibers are characterized in that a part of the hydroxyl group of the cellulose is oxidized to at least one functional group selected from the group consisting of a carboxyl group and an aldehyde group, and the cellulose fibers have a cellulose I crystal structure.

Patent Document 3 below proposes a phosphoric esterified fine cellulose fiber. When the fiber is provided as a 0.2 masse aqueous dispersion, it has a solution haze of not more than 15, and contains 0.6 to 3.8 mmol/g of a strongly acidic group derived from a phosphoric acid group.

PRIOR ART DOCUMENTS

Patent Documents

[Patent Document 1] JP 4965528 B
[Patent Document 2] JP 4998981 B
[Patent Document 3] JP 6128212 B

SUMMARY OF THE INVENTION

Problem to be Solved by the Invention

However, since the cellulose nanofibers described in these patent documents have a long fiber length, they are still unsatisfactory from the viewpoint of the gas-barrier properties. Cellulose nanofibers chemically treated using a TEMPO catalyst have high viscosity, and thus, the fibers are still unsatisfactory from the viewpoint of handleability or the like. For instance, a coating composition containing the fibers may have poor coatability. The cellulose nanofibers can provide greater gas-barrier properties when the fiber length is decreased, but this may require an additional treatment and impair its economic efficiency.

Cellulose nanocrystal, which is obtained by hydrolyzing cellulose fibers with a strong acid, has been known as nanocellulose having a fiber length shorter than that of cellulose nanofibers. However, usual cellulose nanocrystal is inferior in gas-barrier properties to the aforementioned cellulose nanofibers comprising the carboxyl group or the like.

Therefore, it is an object of the present invention to provide nanocellulose having a short fiber length and containing a large amount of anionic functional groups. The nanocellulose is capable of exhibiting excellent barrier properties and handleability, and also excellent economic efficiency. The present invention provides also a method for producing the nanocellulose.

Another object of the present invention is to provide a product having a nanocellulose-containing layer imparted with excellent gas-barrier properties and interlayer adhesiveness.

Means for Solving the Problems

The present invention provides nanocellulose containing a sulfuric acid group and/or a sulfo group each derived from a sulfuric acid treatment, and an anionic functional group derived from a hydrophilization treatment, wherein the total amount of the sulfuric acid group and/or the sulfo group and the anionic functional group is more than 0.1 mmol/g and not more than 4.0 mmol/g.

It is preferable in the nanocellulose of the present invention that:
1. the sulfuric acid group and/or the sulfo group is a sulfuric acid group and/or a sulfo group derived from a sulfuric acid treatment of cellulose nanocrystal;
2. the anionic functional group is at least one selected from a sulfuric acid group, a sulfo group, a phosphoric acid group, or a carboxyl group; and
3. the nanocellulose contains cellulose nanocrystal having a fiber width of not more than 50 nm and an aspect ratio in a range of 5 to 50, and/or cellulose nanofibers having a fiber width of not more than 50 nm and an aspect ratio of not less than 10.

The present invention further provides a product comprising a mixture containing the nanocellulose and a polyvalent cationic resin.

In the product, the polyvalent cationic resin is preferably polyethyleneimine.

The present invention further provides a method for producing nanocellulose according to any one of claims 1 to 4. The method comprises: subjecting cellulose nanocrystal that contains a sulfuric acid group and/or a sulfo group to a hydrophilization treatment. Here, the cellulose nanocrystal is obtainable by subjecting a cellulose material to a sulfuric acid treatment.

It is preferable in the method for producing nanocellulose of the present invention that the hydrophilization treatment is a treatment to use any of carbodiimide, sulfuric acid, a sulfur trioxide-pyridine complex, phosphoric acid-urea, a TEMPO catalyst, or an oxidant.

Effect of the Invention

The nanocellulose of the present invention contains a sulfuric acid group, a sulfo group, and an anionic functional group such as a carboxyl group in an amount of more than 0.1 mmol/g and not more than 4.0 mmol/g. Since a dense self-organization structure is formed due to charge repulsion in the nanocellulose, excellent gas-barrier properties can be exhibited.

The cellulose nanocrystal having a short fiber length contributes to further improve the gas-barrier properties as a synergy with the self-organization structure.

In a product formed of a mixture containing the nanocellulose of the present invention and a polyvalent cationic resin, the polyvalent cationic resin is spontaneously diffused among the nanocellulose fibers to make a mixture where the polyvalent cationic resin is present among the nanocellulose fibers while the dense self-organization structure of the nanocelluloses is maintained. As a result, the self-organization structure of the nanocellulose is further reinforced by the polyvalent cationic resin so that the mixture exhibits gas-barrier properties superior to those of the nanocellulose alone.

In the method for producing nanocellulose of the present invention, nanocellulose containing an anionic functional group in an amount of more than 0.1 mmol/g and not more than 4.0 mmol/g can be efficiently produced.

BRIEF DESCRIPTION OF THE DRAWINGS

The figure is a graph showing the result of the component analysis by TOF-SIM analyzer of the product obtained in Example 1.

MODE FOR CARRYING OUT THE INVENTION (Nanocellulose)

The nanocellulose of the present invention is a nanocellulose containing a sulfuric acid group and/or a sulfo group each derived from a sulfuric acid treatment and an anionic functional group derived from a hydrophilization treatment. The essential feature of the nanocellulose is that the total amount of the sulfuric acid group and/or the sulfo group and the anionic functional group is more than 0.1 mmol/g and not more than 4.0 mmol/g, and particularly in the range of 0.3 to 1.3 mmol/g.

As mentioned above, the nanocellulose exhibits the gas-barrier properties since the self-organization structure formed by charge repulsion between nanocelluloses makes a barrier in the permeation path for the permeated gas. In the nanocellulose of the present invention, an anionic functional group such as a sulfuric acid group, a sulfo group, or a carboxyl group is present on the surface of the nanocellulose in an amount within the above-described range, so that the self-organization structure can be efficiently formed by the charge (anion) possessed by these anionic functional groups, whereby excellent gas-barrier properties can be exhibited. In other words, when the amount of the anionic functional group is smaller than the range, a sufficient self-organization structure may not be formed, and desired gas-barrier properties cannot be obtained. When the amount of the anionic functional group is larger than the range, the crystal structure of the nanocellulose cannot be maintained, and as a result, the gas-barrier properties may be impaired.

As described below, since cellulose nanocrystal is used as a starting material in the present invention, nanocellulose having a short fiber length and excellent in gas-barrier properties can be obtained. The nanocellulose can exhibit excellent gas-barrier properties as a synergy with the aforementioned self-organization structure.

The cellulose nanocrystal is particularly preferred since it is cellulose nanocrystal hydrolyzed by the sulfuric acid treatment, and thus, it contains inherently a sulfuric acid group and/or a sulfo group that contributes to formation of a self-organization structure. In other words, some cellulose nanocrystal may be obtained through acid hydrolysis performed by subjecting the cellulose fibers to either a sulfuric acid treatment or a hydrochloric acid treatment. Since cellulose nanocrystal obtained by hydrochloric acid treatment does not have sulfuric acid groups and/or sulfo groups, it cannot exhibit barrier properties comparable with those of cellulose nanocrystal obtained by a sulfuric acid treatment and having a sulfuric acid group and/or a sulfo group that can contribute to the formation of the self-organization structure.

The anionic functional group to be contained in the nanocellulose of the present invention is selected depending on the method for hydrophilization treatment of nanocellulose as described later. Particularly preferred examples thereof include a carboxyl group, a phosphoric acid group, and a sulfuric acid group and/or a sulfo group. As a result, the self-organization structure described above is efficiently formed, and the gas-barrier properties can be improved.

In this specification, the term "sulfuric acid group" represents a concept including a sulfate group.

Since the nanocellulose of the present invention contains the sulfuric acid group and/or the sulfo group and the anionic functional group in a total amount within the aforementioned ranges, the crystallinity is preferably 60% or more.

The nanocellulose of the present invention can contain cellulose nanocrystal having a fiber width of not more than 50 nm and an aspect ratio in the range of 5 to 50 and/or cellulose nanofibers having a fiber width of not more than 50 nm and an aspect ratio of not less than 10, as long as the aforementioned conditions are satisfied.

More specifically, the cellulose nanocrystal, which is the starting material having a fiber width of not more than 50 nm and an aspect ratio in the range of 5 to 50, can be contained as it is. Alternatively, cellulose nanofibers having a fiber width of not more than 50 nm and an aspect ratio of not less than 10 can be contained as desired.

(Method for Producing Nanocellulose)

The nanocellulose of the present invention can be produced by subjecting cellulose nanocrystal that contains a sulfuric acid group and/or a sulfo group to a hydrophilization treatment, where the cellulose nanocrystal is obtained by subjecting a cellulose material to a sulfuric acid treatment. Before and/or after the hydrophilization treatment, a defibration treatment and/or a dispersion treatment can be conducted if necessary.

[Cellulose Nanocrystal]

The cellulose nanocrystal used as the material of nanocellulose in the present invention comprises rod-like cellulose crystalline fibers. This cellulose nanocrystal is obtained by subjecting cellulose fibers such as pulp to an acid hydrolysis treatment using sulfuric acid or hydrochloric acid. In the present invention, cellulose nanocrystal obtained by a sulfuric acid treatment is used. The cellulose nanocrystal has a sulfuric acid group and/or a sulfo group capable of contributing to formation of the self-organization structure.

The cellulose nanocrystal preferably contains a sulfuric acid group and/or a sulfo group in an amount of 0.01 to 0.1 mmol/g. The cellulose nanocrystal that can be suitably used may have an average fiber diameter of not more than 50 nm, particularly in the range of 2 to 50 nm; an average fiber length in the range of 100 to 500 nm; an aspect ratio in the range of 5 to 50; and a crystallinity of not less than 60%, particularly not less than 70%.

The nanocellulose of the present invention is obtained by subjecting cellulose nanocrystal having a sulfuric acid group and/or a sulfo group to a hydrophilization treatment described later. Alternatively, cellulose nanofibers produced by a conventional oxidation method and having a fiber width of not more than 50 nm and an aspect ratio of not less than 10 may be contained within a range not to impair the excellent barrier properties and handleability of the nanocellulose of the present invention. Specifically, the cellulose nanofibers can be contained in an amount of less than 50% of the cellulose nanocrystal.

[Hydrophilization Treatment]

In the present invention, the hydrophilization treatment of the cellulose nanocrystal having the sulfo group is conducted in order to adjust the amount of the sulfuric acid group and/or the sulfo group, or to introduce an anionic functional group such as a carboxyl group or a phosphoric acid group into a hydroxyl group at the 6-position of the cellulose, thereby preparing nanocellulose that contains an anionic functional group such as a sulfuric acid group, a sulfo group, a carboxyl group, or a phosphoric acid group in a total amount of more than 0.1 mmol/g and not more than 4.0 mmol/g, particularly in the range of 0.3 to 1.3 mmol/g.

The hydrophilization treatment is conducted using any of water-soluble carbodiimide, sulfuric acid, a sulfur trioxide-pyridine complex, phosphoric acid-urea, a TEMPO catalyst, or an oxidant. A treatment with any of the carbodiimide, the sulfuric acid or the sulfur trioxide-pyridine complex serves to adjust the amount of sulfuric acid and/or sulfo group in the cellulose nanocrystal, and it decreases further the fiber length of the nanocellulose. A treatment using any one of the phosphoric acid-urea, the TEMPO catalyst or the oxidant serves to introduce an anionic functional group of a phosphoric acid group or a carboxyl group to adjust the total amount of the anionic functional group in the nanocellulose within the aforementioned range.

Any one of the treatments may be conducted for hydrophilization treatment as long as the total amount of the anionic functional group is within the range. Alternatively, one of the treatments can be conducted plural times alone or in combination with any other treatment.

<Hydrophilization Treatment Using Carbodiimide>

In the treatment using carbodiimide, cellulose nanocrystal and carbodiimide are stirred in a solvent such as dimethylformamide, and sulfuric acid is added thereto for a reaction at a temperature in a range of 0 to 80° C. for 5 to 300 minutes, thereby obtaining a sulfuric ester. The carbodiimide and the sulfuric acid are preferably used in amounts of 5 to 30 mmol and 5 to 30 mmol respectively per gram of the cellulose nanocrystal (solid content).

Subsequently, an alkaline compound such as sodium hydroxide is added thereto to convert the sulfo group that has been introduced into the cellulose nanocrystal from H-form to Na-form preferably for improving the yield. Later, filtration with a dialysis membrane or the like is conducted to remove impurities and the like, thereby preparing sulfo group-modified cellulose nanocrystal.

An example of the carbodiimide that can be used here is a 1-ethyl-3-(3-dimethylaminopropyl)carbodiimide, which is a water-soluble compound having a carbodiimide group ($-N=C=N-$) in its molecules. It is also possible to use dicyclohexylcarbodiimide or the like, which is dissolvable in an organic solvent.

<Hydrophilization Treatment Using Sulfuric Acid>

The cellulose nanocrystal used in the present invention is prepared by subjecting cellulose fibers to a hydrolysis treatment using sulfuric acid. This cellulose nanocrystal is further subjected to a hydrophilization treatment using sulfuric acid. The sulfuric acid is preferably used in an amount of 40 to 60% by mass per gram of the cellulose nanocrystal (solid content). As a result of reaction at a temperature of 40 to 60° C. for 5 to 300 minutes and the following filtration treatment using a dialysis membrane to remove impurities and the like, a sulfuric acid group and/or sulfo group-modified cellulose nanocrystal is prepared.

<Hydrophilization Treatment Using Sulfur Trioxide-Pyridine Complex>

In the treatment using the sulfur trioxide-pyridine complex, the cellulose nanocrystal is allowed to react with the sulfur trioxide-pyridine complex in dimethyl sulfoxide for 5 to 240 minutes at a temperature in a range of 0 to 60° C. so as to introduce the sulfuric acid group and/or the sulfo group into the hydroxyl group at the 6-position of the cellulose glucose unit.

The sulfur trioxide-pyridine complex is preferably formulated in mass from 0.5 to 4 g per gram of the cellulose nanocrystal (solid content).

After the reaction, preferably an alkaline compound such as sodium hydroxide is added to convert the sulfuric acid group and/or the sulfo group that has been introduced into the cellulose nanocrystal from H-form to Na-form in order to improve the yield. Thereafter, dimethylformamide or isopropyl alcohol is added. After washing by centrifugation or the like, impurities and the like are removed by a filtration treatment using a dialysis membrane or the like, and the thus obtained concentrate is dispersed in water, whereby a sulfuric acid group and/or a sulfo group-modified cellulose nanocrystal is prepared.

<Hydrophilization Treatment Using Phosphoric Acid-Urea>

The hydrophilization treatment using phosphoric acid-urea can be conducted in the same manner as in the conventionally known treatment of introducing a phosphoric acid group by use of phosphoric acid-urea. Specifically, cellulose nanocrystal is made to react with a phosphoric acid group-containing compound in the presence of a urea-containing compound for 5 to 120 minutes at a temperature in a range of 135 to 180° C., whereby the phosphoric acid group is introduced into a hydroxyl group of a cellulose glucose unit.

Examples of the phosphoric acid group-containing compound include phosphoric acid, a lithium salt of phosphoric acid, a sodium salt of phosphoric acid, a potassium salt of phosphoric acid, and an ammonium salt of phosphoric acid. Among them, sodium dihydrogen phosphate, ammonium dihydrogen phosphate, phosphoric acid or the like can be suitably used singly or as a mixture. The phosphoric acid group-containing compound is preferably added in an amount of 10 to 100 mmol relative to 10 g (solid content) of the cellulose nanocrystal.

Examples of the urea-containing compound include urea, thiourea, burette, phenylurea, benzyl urea, and dimethyl urea. Among them, urea can be suitably used. The urea-containing compound is preferably used in an amount of 150 to 200 mmol relative to 10 g (solid content) of the cellulose nanocrystal.

<Hydrophilization Treatment Using TEMPO Catalyst>

The hydrophilization treatment using a TEMPO catalyst (2,2,6,6-tetramethylpiperidine-1-oxyl) can be conducted in the same manner as in any of conventionally known oxidation methods using a TEMPO catalyst. Specifically, in the hydrophilization reaction, of a cellulose nanocrystal having a sulfuric acid group and/or a sulfo group, a hydroxyl group at the 6-position of a cellulose glucose unit is oxidized to a carboxyl group via a TEMPO catalyst (2,2,6,6-tetramethylpiperidine 1-oxyl) under conditions of an aqueous system, an ordinary temperature, and an ordinary pressure.

The 2,2,6,6-tetramethylpiperidine 1-oxyl used as the TEMPO catalyst can be replaced by a derivative of TEMPO, such as 4-acetamido-TEMPO, 4-carboxy-TEMPO, or 4-phosphonoxy-TEMPO.

The use amount of TEMPO catalyst is set to a range of 0.01 to 100 mmol, preferably 0.01 to 5 mmol per gram of the cellulose nanocrystal (solid content).

In the hydrophilization-oxidation treatment, the TEMPO catalyst may be used alone or together with an oxidant or a co-oxidant such as a bromide or an iodide.

Examples of the oxidant include known oxidants such as halogen, hypohalous acid, halous acid, perhalogenic acid or salts thereof, halogen oxide and peroxide. Sodium hypochlorite or sodium hypobromite can be used particularly preferably. The amount of oxidant is set to a range of 0.5 to 500 mmol, preferably 5 to 50 mmol per gram of the cellulose nanocrystal (solid content). After a certain period of time from addition of the oxidant, an additional oxidation treatment can be conducted by incorporating a further oxidant.

As the co-oxidant, an alkali metal bromide such as sodium bromide, or an alkali metal iodide such as sodium iodide can be suitably used. The amount of co-oxidant is set to a range of 0.1 to 100 mmol, preferably 0.5 to 5 mmol per gram of the cellulose nanocrystal (solid content).

Further, it is preferable that the reaction medium of the reaction solution is water or an alcohol solvent.

The reaction temperature in the hydrophilization treatment ranges from 1 to 50° C., particularly from 10 to 50° C., and it may be room temperature. The reaction time is in a range of 1 to 360 minutes, and particularly preferably from 60 to 240 minutes.

As the reaction proceeds, carboxyl groups are formed in the cellulose, and this may lower the pH of the slurry. In order to efficiently make the oxidation reaction proceed, it is desirable to maintain the pH in the range of 9 to 12 using a pH-adjusting agent such as sodium hydroxide.

After the oxidation treatment, the catalyst and the like used in the treatment are removed by washing with water or the like.

[Defibration Treatment]

In the method for producing nanocellulose of the present invention, it is also possible to conduct a defibration treatment after the hydrophilization treatment, though this is not mandatory because the present invention uses cellulose nanocrystal having a short fiber length as the material.

The defibration treatment can be conducted by any of conventionally-known methods, for instance, using an ultrahigh-pressure homogenizers, an ultrasound homogenizer, a grinder, a high-speed blender, a bead mill, a ball mill, a jet mill, a disassembler, a beater or a biaxial extruder.

The defibration treatment can be conducted in either dry or wet process, depending on the conditions of the nanocellulose after the hydrophilization treatment or use of the nanocellulose. Since the nanocellulose is suitably used as a dispersion liquid, it is suitable to defibrate with an ultrahigh-pressure homogenizer or the like using water or the like as a dispersion medium.

[Dispersion Treatment]

The nanocellulose of the present invention is preferably subjected to a dispersion treatment because it is suitably used as a dispersion liquid for formation of a product and the like mentioned below.

In the dispersion treatment, a dispersing machine such as an ultrasonic disperser, a homogenizer, or a mixer can be suitably used. Alternatively, stirring with a stirring bar, a stirring stone or the like can be conducted therefor.

The dispersion liquid containing the hydrophilized nanocellulose is a water dispersion containing 1% by mass of solid content, and it has a viscosity of 10 to 40000 mPa·s (measured with a rheometer, temperature: 30° C.) and a zeta potential in the range of −60 to −10 mV. This liquid is excellent in handleability and coatability, from which a gas-barrier material described later can be easily produced.

The nanocellulose of the present invention contains cellulose nanocrystal having a short fiber length and a small fiber diameter, and it contains also an anionic functional group in an amount of more than 0.1 mmol/g and not more than 4.0 mmol/g, preferably in a range of 0.3 to 1.3 mmol/g. When this nanocellulose is contained in an amount of 1.0 $g/m^2$ as a solid content, an oxygen permeability at 23° C. 0% RH is less than 0.4 ($cc/m^2$·day·atm), namely, the gas-barrier properties is excellent. Further, due to the short fiber length, the dispersibility, the coatability, the drying handleability and the like are excellent.

(Product)

The product of the present invention comprises a mixture containing the nanocellulose and the polyvalent cationic resin. The product is capable of exhibiting excellent oxygen barrier properties. Specifically, when the nanocellulose is contained in an amount of 1.0 $g/m^2$ as a solid content, the oxygen permeability at 23° C. 0% RH is less than 0.40 ($cc/m^2$·day·atm) Further, the product provided on a substrate is capable of remarkably improving adhesion with the substrate layer.

The product of the present invention is prepared by forming a layer containing the nanocellulose on a layer of the polyvalent cationic resin, so that it can be formed as a product of a mixture in a state capable of exhibiting the gas-barrier properties and the adhesion to the substrate. In other words, this mixture is obtained by mixing the polyvalent cationic resin and the nanocellulose while maintaining the self-organization structure of the nanocellulose, although it may be difficult to quantitatively express the mixed state in the product of the present invention. In the mixture of the product, both the nanocellulose and the polyvalent cationic resin are present from the area in the vicinity of the surface of the outermost portion to the area in the vicinity of the substrate comprising a thermoplastic resin.

[Polyvalent Cationic Resin]

The polyvalent cationic resin used in the product of the present invention is a resin containing a water-soluble or water-dispersible polyvalent cationic functional group. Examples of the polyvalent cationic resin include: water-soluble amine polymers such as polyethyleneimine, polyallylamine, polyamine polyamide-epichlorohydrin, and polyamine epichlorohydrin; polyacrylamide; poly(diallyldimethylammonium salt); dicyandiamide formalin; poly(meth)acrylate; cationized starch; cationized gum; chitosan;

chitin; and gelatin. Among them, a water-soluble amine polymer, particularly polyethyleneimine can be suitably used.

(Method for Producing Product)

The product of the present invention can be produced by: coating and drying a solution containing a polyvalent cationic resin so as to form a layer of the polyvalent cationic resin; and coating and drying a nanocellulose-containing dispersion liquid on the layer of the polyvalent cationic resin. The thus produced product comprises a mixture containing the polyvalent cationic resin and the nanocellulose which are mixed with each other in a unique manner.

Alternatively, the solution containing the polyvalent cationic resin may be coated on a substrate of a thermoplastic resin so that a laminate comprising a product of the nanocellulose and the polyvalent cationic resin can be formed on the substrate. In another method, the polyvalent cationic resin-containing solution and the nanocellulose-containing dispersion liquid are coated and dried in this order to form a cast film, which can be used as a gas-barrier film.

[Coating and Drying Polyvalent Cationic Resin-Containing Solution]

The polyvalent cationic resin containing-solution preferably contains the resin in an amount of 0.01 to 30% by mass, particularly 0.1 to 10% by mass, in terms of the solid content. When the amount of the polyvalent cationic resin is smaller than the range, unlike the case where the polyvalent cationic resin is within the range, the gas-barrier properties and the interfacial peeling strength cannot be improved. Even when the amount of the polyvalent cationic resin is larger than the range, the gas-barrier properties and the interfacial peeling strength cannot be further improved, and this may degrade not only the economic performance but the coatability and the film formability.

Examples of the solvent used in the polyvalent cationic resin-containing solution include: water; alcohols such as methanol, ethanol, and isopropanol; ketones such as 2-butanone and acetone; aromatic solvents such as toluene; and, a mixed solvent of water and any of these components.

The coating amount of the polyvalent cationic resin-containing solution is determined according to the concentration of the solution containing the polyvalent cationic resin in terms of the amount of nanocellulose (solid content) in the layer formed from the below-mentioned nanocellulose-containing dispersion liquid. That is, when 1.0 g/m$^2$ of the nanocellulose (solid content) is contained as described above, the solution is preferably coated so that 0.01 to 2.0 g/m$^2$ of the polyvalent cationic resin is contained. When the amount of the polyvalent cationic resin is less than the range, it may be impossible to improve the interfacial peeling strength to the hydrophobic substrate material such as a polyester resin unlike the case where the amount is within the range. When the amount of the polyvalent cationic resin exceeds the range, the gas-barrier properties of the product may not be improved unlike the case where the amount is within the range.

Examples of coating methods include spray coating, immersion, or coating with a bar coater, a roll coater, a gravure coater or the like, though the present invention is not limited to these examples. The coated film is preferably dried under conditions at a temperature of 5 to 200° C. and for 0.1 seconds to 24 hours. The drying treatment can be conducted by oven drying, infrared heating, high-frequency heating or the like. Alternatively, natural drying can be employed.

[Coating and Drying of Nanocellulose-Containing Dispersion Liquid]

The nanocellulose-containing dispersion liquid preferably contains the nanocellulose in an amount of 0.01 to 10% by mass, particularly 0.5 to 5.0% by mass, in terms of the solid content. When the content is less than the range, the gas-barrier properties are inferior as compared with the case where the content is within the range. When the content exceeds the range, the coatability and the film formability may become inferior as compared with the case where the content is in the range.

For the dispersion liquid, water can be used alone. Alternatively, the dispersion liquid may be a mixed solvent of water and alcohol such as methanol, ethanol, or isopropanol, ketone such as 2-butanone and acetone, or an aromatic solvent such as toluene.

Any well-known additives can be blended in the solution containing the polyvalent cationic resin or the nanocellulose-containing dispersion liquid as required, and examples of the additive include filler, a colorant, an ultraviolet absorber, an antistatic agent, a waterproofing agent, a clay mineral, a crosslinking agent, a metal salt, fine particles, colloidal silica, an alumina sol, and titanium oxide.

It is preferable that the nanocellulose-containing dispersion liquid is coated so that the content of the nanocellulose (solid content) will be 0.1 to 3.0 g/m.

The coating and drying of the nanocellulose-containing dispersion liquid can be conducted in a manner similar to the method of coating and drying the polyvalent cationic resin-containing solution. It is preferable to dry under conditions of a temperature in a range of 5 to 200° C. for 0.1 second to 24 hours.

(Laminate)

A laminate comprising the product of the present invention is formed by arranging a barrier layer of the product of the present invention on a layer of a thermoplastic resin. Since the polyvalent cationic resin serves to improve the interfacial peel strength between the barrier layer and the layer of a hydrophobic resin, the interfacial peel strength of the barrier layer and the layer of thermoplastic resin is 2.3 (N/15 mm) or more, whereby delamination between the barrier layer and the substrate can be effectively prevented.

As described above, the laminate can be produced by: coating and drying the polyvalent cationic resin-containing solution on a layer (substrate) of a thermoplastic resin so as to form a polyvalent cationic resin-containing layer; and coating and drying a nanocellulose-containing dispersion liquid on the polyvalent cationic resin-containing layer, so that a barrier layer comprising a product of a mixture of the polyvalent cationic resin and the nanocellulose is formed on the layer (substrate) of the thermoplastic resin.

A thermoplastic resin can be used for the substrate. This substrate is subjected to extrusion, injection, blowing, stretch-blowing or pressing to be formed into a film or a sheet, or a product shaped as a bottle, a cup or a tray.

Though the thickness of the substrate may vary depending on the shape, use or the like of the laminate and it cannot be determined unconditionally, it is preferably in the range of 5 to 50 μm for a film.

Examples of the thermoplastic resin include: olefin-based copolymers such as low-, medium- or high-density polyethylene, linear low-density polyethylene, polypropylene, ethylene-propylene copolymer, ethylene-butene-copolymer, ionomer, ethylene-vinyl acetate copolymer, and ethylene-vinyl alcohol copolymer; aromatic polyesters such as polyethylene terephthalate, polybutylene terephthalate, polyethylene terephthalate/isophthalate, and polyethylene naphthalate; aliphatic polyesters such as polylactic acid, polycaprolactone, and polybutylene succinate; polyamides such as nylon 6, nylon 6,6, nylon 6,10, and metaxylylene adipamide; styrene-based copolymers such as polystyrene, styrene-butadiene block copolymer, styrene-acrylonitrile copolymer, and styrene-butadiene-acrylonitrile copolymer (ABS resin); vinyl chloride-based copolymers such as polyvinyl chloride, and vinyl chloride-vinyl acetate copolymer; acrylic copolymers such as polymethyl methacrylate, and methyl methacrylate-ethyl acrylate copolymer; polycarbonate; cellulose-based resins; and regenerated cellulose such as acetyl cellulose, cellulose acetyl propionate, cellulose acetate butyrate, and cellophane. Among them, polyethylene terephthalate can be suitably used.

The thermoplastic resin may be blended with one or plural kinds of additives such as a pigment, an antioxidant, an antistatic agent, an ultraviolet absorber, or a lubricants, if desired.

In the present invention, one or more additional layers other than the substrate and the layer of the product can be formed if necessary.

Since the gas-barrier properties of the nanocellulose-containing layer deteriorate under high-humidity conditions, it is preferable to further form a layer of a conventionally-known moisture-resistant resin such as an olefin resin or a polyester resin.

EXAMPLES

Examples of the present invention will be described below. It should be noted that these Examples are simply a part of the present invention, and the present invention is not limited to these Examples. Methods for the measurement for the respective items are described below.

<Content of Anionic Functional Group>

A nanocellulose-containing dispersion liquid was weighed, to which ion-exchanged water was added to prepare 100 ml of 0.05 to 0.3 mass % nanocellulose-containing dispersion liquid. Further, a cation-exchange resin (0.1 g) was added thereto and stirred. Later, filtration was conducted to separate the cation-exchange resin from the nanocellulose-containing dispersion liquid. A 0.05M sodium hydroxide solution was added dropwise to the cation-exchanged dispersion liquid using an automatic potentiometric titrator (manufactured by Kyoto Electronics Manufacturing Co., Ltd.) to measure the change in electrical conductivity exhibited by the nanocellulose-containing dispersion liquid. The amount of the titrated sodium hydroxide consumed for neutralization of the anionic functional group was determined from the obtained conductivity curve, from which the content of the anionic functional group (mmol/g) was calculated using the following formula.

Anionic functional group content (mmol/g)=Amount
of titrated sodium hydroxide (ml) consumed for
neutralization of anionic functional groups×
Concentration of sodium hydroxide (mmol/ml)
÷Solid mass of nanocellulose (g)

<Oxygen Permeability>

The oxygen permeability of the product (cc/m² day·atm) was measured at 23° C. 0% RH using an oxygen permeation analyzer (OX-TRAN2/22, MOCON).

<TOF-SIMS>

A product of a mixture containing a polyvalent cationic resin and nanocellulose was cut into 1 cm×1 cm squares and fixed to a specimen stage, with its coating surface facing upward. In a TOF-SIMS analyzer (TRIFT V manufactured by ULVAC-PHI Inc.), the product was analyzed from the surface of the coating to the interior of the substrate while being etched. The product was irradiated with primary ions ($Bi_3^{2+}$), using Ar-gas cluster ions ($Ar_n^+$) as etching ions. The primary ion acceleration voltage was 30 KV, the measurement polarity was negative ions, and a neutralization gun for charge correction was used. The results are shown in the Figure.

Example 1

<Preparation of Nanocellulose-Containing Dispersion Liquid>

Cellulose nanocrystal was prepared by decomposing pulp with 64 wt % sulfuric acid, and 1 g (solid content) of the cellulose nanocrystal was dispersed in 5 ml of N,N-dimethylformamide to prepare a cellulose nanocrystal dispersion liquid. 10 mmol of 1-ethyl-3-(3-diethylaminopropyl)carbodiimide hydrochloride (manufactured by Tokyo Chemical Industry Co., Ltd.) was dissolved in another 5 ml of N,N-dimethylformamide to make a solution, and the solution was added to the cellulose nanocrystal dispersion liquid to be dispersed in 5 minutes. 10 mmol of sulfuric acid was dispersed in another 5 ml of N,N-dimethylformamide to prepare a dispersion liquid, and the liquid was introduced slowly into the cellulose nanocrystal dispersion liquid, and the cellulose nanocrystal was subjected to a hydrophilization treatment while being stirred at 0° C. for 60 minutes, thereby preparing a nanocellulose-containing dispersion liquid. After adding ion-exchanged water and sodium hydroxide solution, the nanocellulose-containing dispersion liquid was introduced into the interior of a dialysis membrane (manufactured by Spectrum Laboratories P.L.C., fractionated molecular weight of 3500 to 5000 D) and allowed to stand in ion-exchanged water to remove impurities and the like, thereby preparing the nanocellulose-containing dispersion liquid. Ion-exchanged water was added to the purified nanocellulose-containing dispersion liquid and the liquid was subjected to a dispersion treatment with a mixer, whereby a nanocellulose-containing dispersion liquid containing 1% by mass of nanocellulose (solid content) was obtained. The anionic functional group content of the nanocellulose was 0.7 mmol/g.

<Production of Product of Mixture Containing Polyvalent Cationic Resin and Nanocellulose>

A product of a mixture containing a polyvalent cationic resin and nanocellulose was prepared by the following procedure. A corona-treated substrate of a biaxially-stretched PET film (Lumirror P60, 12 μm, manufactured by Toray Industries, Inc.) was used for this purpose. On this substrate, polyethyleneimine (PEI) (EPOMIN P-1000, manufactured by Nippon Shokubai Co., Ltd.) was coated with a bar coater so that the solid content would be 0.6 g/m². It was dried to be solidified at 50° C. for 10 minutes by a hot air dryer (MSO-TP, manufactured by ADVANTEC CO., LTD.). Using a bar coater, 1 mass' nanocellulose-containing dispersion liquid prepared by the aforementioned method was coated thereon, and air-dried at room temperature overnight. The coating amount of the nanocellulose was 1.0 g/m² as a solid content. The oxygen permeability of the product was 0.26 cc/m²·day·atm.

Example 2

Cellulose nanocrystal was prepared by decomposing pulp with 64 wt, sulfuric acid, and 1 g (solid content) of the cellulose nanocrystal was dispersed in 20 ml of dimethyl sulfoxide to prepare a cellulose nanocrystal dispersion liquid. 1 g of sulfur trioxide-pyridine complex (manufactured by Tokyo Chemical Industry Co., Ltd.) was dispersed in 20 ml of another dimethyl sulfoxide and this solution was added to the cellulose nanocrystal dispersion liquid, and the cellulose nanocrystal was subjected to a hydrophilization treatment while stirring at 25° C. for 60 minutes to prepare a nanocellulose-containing dispersion liquid. Later, a sodium hydroxide solution and 2-propanol were added, and washing was conducted using an ultracentrifuge (50000 rpm, 10 minutes). Thereafter, ion-exchanged water and a sodium hydroxide solution were further added thereto, and the liquid was placed in the interior of a dialysis membrane (manufactured by Spectrum Laboratories P.L.C., fractionated molecular weight: 3500 to 5000 D) and allowed to stand in ion-exchanged water to remove impurities and the like, thereby preparing the nanocellulose-containing dispersion liquid. Ion-exchanged water was added to the purified nanocellulose-containing dispersion liquid so as to conduct a dispersion treatment, whereby a nanocellulose-containing dispersion liquid containing nanocellulose having a solid content of 1% by mass was obtained. The anionic functional group content of nanocellulose was 0.5 mmol/g. The same procedure as in Example 1 was conducted except that a 1 mass % nanocellulose-containing dispersion liquid produced by the aforementioned method was used to obtain a product comprising a mixture containing a polyvalent cationic resin and nanocellulose. The oxygen permeability of the product was 0.35 cc/m$^2$·day·atm.

Example 3

Cellulose nanocrystal was prepared by decomposing pulp with 64 mass % sulfuric acid, and 1 g (solid content) of the cellulose nanocrystal was dispersed in 10 ml of ion-exchanged water. Sulfuric acid was further added to prepare a cellulose nanocrystal dispersion liquid containing 50 mass % sulfuric acid. The cellulose nanocrystal was subjected to a hydrophilization treatment while stirring at 40° C. for 240 minutes to prepare a nanocellulose-containing dispersion liquid. Ion-exchanged water and a sodium hydroxide solution were further added, and the liquid was placed in the interior of a dialysis membrane (manufactured by Spectrum Laboratories P.L.C., fractionated molecular weight: 3500 to 5000 D) and allowed to stand in ion-exchanged water to remove impurities and the like, thereby preparing the nanocellulose-containing dispersion liquid. Ion-exchanged water was added to the purified nanocellulose-containing dispersion liquid and a dispersion treatment was conducted, whereby a nanocellulose-containing dispersion liquid containing nanocellulose having a solid content of 1% by mass was obtained. The anionic functional group content of nanocellulose was 0.4 mmol/g. The same procedure as in Example 1 was conducted except that a 1 mass % nanocellulose-containing dispersion liquid produced by the aforementioned method was used to obtain a product comprising a mixture containing a polyvalent cationic resin and nanocellulose. The oxygen permeability of the product was 0.40 cc/m$^2$·day·atm.

Example 4

A phosphoric acid solution was prepared by dissolving 10 g of urea, 6 g of disodium dihydrogen phosphate dihydrate and 4 g of disodium hydrogen phosphate in 10 g of ion-exchanged water. To this phosphoric acid solution, 10 g (solid content) of cellulose nanocrystal prepared by decomposing pulp with 64 mass % sulfuric acid was added and a dispersion treatment was conducted. The thus obtained cellulose nanocrystal dispersion liquid was heated at 165° C. for 30 minutes using a multiple safety dryer (manufactured by Futaba Science Co., Ltd.) while evaporating the cellulose nanocrystal dispersion liquid, and the cellulose nanocrystal was subjected to a hydrophilization treatment. Thereafter, 100 ml of ion-exchanged water was added and a dispersion treatment was conducted, and then, washing was conducted using an ultracentrifuge (50000 rpm, 10 minutes). Further ion-exchanged water and a sodium hydroxide solution were added to adjust pH to 12, and washing was conducted using an ultracentrifuge (50000 rpm, 10 minutes) while adding ion-exchanged water until the pH reached 8. Thereafter, it was placed in the interior of a dialysis membrane (manufactured by Spectrum Laboratories P.L.C., fractionated molecular weight: 3500 to 5000 D) and allowed to stand in ion-exchanged water to remove impurities and the like, thereby preparing the nanocellulose-containing dispersion liquid. Ion-exchanged water was added to the purified nanocellulose-containing dispersion liquid and a dispersion treatment was conducted, whereby a nanocellulose-containing dispersion liquid having a solid content of nanocellulose of 1% by mass was obtained. The anionic functional group content of nanocellulose was 0.3 mmol/g. The same procedure as in Example 1 was conducted except that a 1 mass % nanocellulose-containing dispersion liquid produced by the aforementioned method was used to obtain a product comprising a mixture containing a polyvalent cationic resin and nanocellulose. The oxygen permeability of the product was 0.20 cc/m$^2$·day·atm.

Example 5

An aqueous dispersion liquid of 10 g of cellulose nanocrystal (solid content) was prepared by decomposing pulp with 64 mass % sulfuric acid. To this dispersion liquid, 0.8 mmol of TEMPO catalyst (manufactured by Sigma Aldrich Co., LLC) and 12.1 mmol of sodium bromide were added, to which ion-exchanged water was further added for filling a 1 L volumetric flask, and the liquid was stirred to be uniformly dispersed. Later, 5 mmol of sodium hypochlorite was added to initiate an oxidation reaction. During the reaction, the pH in the system was kept in a range of 10.0 to 10.5 with 0.5 N sodium hydroxide aqueous solution, and a hydrophilization treatment was conducted while stirring at 30° C. for 4 hours. The thus hydrophilized cellulose nanocrystal was washed using an ultracentrifuge (50000 rpm, 10 minutes) while adding ion-exchanged water until the pH reached 8. Thereafter, it was placed in the interior of a dialysis membrane (manufactured by Spectrum Laboratories P.L.C., fractionated molecular weight: 3500 to 5000 D) and allowed to stand in ion-exchanged water to remove impurities and the like, thereby preparing the nanocellulose-containing dispersion liquid. Ion-exchanged water was added to the purified nanocellulose-containing dispersion liquid and a dispersion liquid treatment was conducted, whereby a nanocellulose-containing dispersion liquid having a solid content of nanocellulose of 1% by mass was obtained. The anionic functional group content of nanocellulose was 0.9 mmol/g. The same procedure as in Example 1 was conducted except that a 1 mass % nanocellulose-containing dispersion liquid produced by the aforementioned method was used to obtain a product comprising a mixture containing a polyvalent cationic resin and nanocellulose. The oxygen permeability of the product was 0.30 cc/m$^2$·day·atm.

Example 6

An aqueous dispersion liquid containing 10 g of cellulose nanocrystal (solid content) was prepared by decomposing pulp with 64 masse sulfuric acid. To this dispersion liquid, 0.8 mmol of TEMPO catalyst (manufactured by Sigma Aldrich Co., LLC) and 12.1 mmol of sodium bromide were added, to which ion-exchanged water was further added for filling a 1 L volumetric flask, and stirred to be uniformly dispersed. Later, 15 mmol of sodium hypochlorite was added to initiate an oxidation reaction. The following procedure was conducted in the same manner as in Example 5, so that a nanocellulose-containing dispersion liquid containing nanocellulose having a solid content of 1% by mass was obtained. The anionic functional group content of nanocellulose was 1.3 mmol/g. The same procedure as in Example 1 was conducted except that a 1 mass % nanocellulose-containing dispersion liquid produced by the aforementioned method was used to obtain a product comprising a mixture containing a polyvalent cationic resin and nanocellulose. The oxygen permeability of the product was 0.11 cc/m$^2$·day·atm.

Example 7

A phosphoric acid solution was prepared by dissolving 24 g of urea and 9 g of ammonium dihydrogen phosphate in 27 g of ion-exchanged water. To this phosphoric acid solution, 20 g (solid content) of cellulose nanocrystal prepared by decomposing pulp with 64 mass % sulfuric acid was added and a dispersion treatment was conducted. The cellulose nanocrystal dispersion liquid was heated at 165° C. for 30 minutes using a multiple safety dryer (manufactured by Futaba Science Co., Ltd.) while evaporating the cellulose nanocrystal dispersion liquid, and the cellulose nanocrystal was subjected to a hydrophilization treatment. Thereafter, 100 ml of ion-exchanged water was added and a dispersion treatment was conducted, and then, washing was conducted using an ultracentrifuge (50000 rpm, 10 minutes). Further ion-exchanged water and a sodium hydroxide solution were added to adjust pH to 12, and washing was conducted using an ultracentrifuge (50000 rpm, 10 minutes) while adding ion-exchanged water until the pH reached 8. Thereafter, it was placed in the interior of a dialysis membrane (manufactured by Spectrum Laboratories P.L.C., fractionated molecular weight: 3500 to 5000 D) and allowed to stand in ion-exchanged water to remove impurities and the like, thereby preparing the nanocellulose-containing dispersion liquid. Ion-exchanged water was added to the purified nanocellulose-containing dispersion liquid and a dispersion treatment was conducted, whereby a nanocellulose-containing dispersion liquid having a solid content of nanocellulose of 11 by mass was obtained. The anionic functional group content of nanocellulose was 0.8 mmol/g. The same procedure as in Example 1 was conducted except that a 1 mass % nanocellulose-containing dispersion liquid produced by the aforementioned method was used to obtain a product comprising a mixture containing a polyvalent cationic resin and nanocellulose. The oxygen permeability of the product was 0.07 cc/m$^2$·day·atm.

Comparative Example 1

Cellulose nanocrystal was prepared by decomposing pulp with 64 mass % sulfuric acid, and 1 g (solid content) of this cellulose nanocrystal was added to ion-exchanged water to conduct a dispersion treatment, whereby a nanocellulose-containing dispersion liquid containing nanocellulose having a solid content of 1 mass % was obtained. The anionic functional group content of nanocellulose was 0.1 mmol/g. The same procedure as in Example 1 was conducted except that a 1 mass % nanocellulose-containing dispersion liquid produced by the aforementioned method was used to obtain a product comprising a mixture containing a polyvalent cationic resin and nanocellulose. The oxygen permeability of the product was 0.43 cc/m$^2$·day·atm.

TABLE 1

|  |  | Example 1 | Example 2 | Example 3 | Example 4 | Example 5 | Example 6 | Example 7 | Comparative Example 1 |
|---|---|---|---|---|---|---|---|---|---|
| Nano-cellulose | Material | CNC*[1] | CNC*[1] | CNC*[1] | CNC*[1] | CNC*[1] | CNC*[1] | CNC*[1] | CNC*[1] |
|  | Hydrophilization treatment | WSC*[2] + sulfuric acid | SO$_3$Py*[3] | Sulfuric acid | Phosphoric acid | TEMPO catalyst oxidation | TEMPO catalyst oxidation | Phosphoric acid | — |
|  | Anionic functional group | *6) | *6) | *6) | *7) | *8) | *8) | *7) | *9) |
|  | Anionic functional group content (mmol/g) | 0.7 | 0.5 | 0.4 | 0.3 | 0.9 | 1.3 | 0.8 | 0.1 |
| Product | Substrate | Biaxially stretched PET | Biaxially stretched PET | Biaxially stretched PET | Biaxially stretched PET | Biaxially stretched PET | Biaxially stretched PET | Biaxially stretched PET | Biaxially stretched PET |
|  | Mixture | Nano-cellulose + PEI *[4] | Nano-cellulose + PEI *[4] | Nano-cellulose + PEI *[4] | Nano-cellulose + PEI *[4] | Nano-cellulose + PEI *[4] | Nano-cellulose + PEI *[4] | Nano-cellulose + PEI *[4] | Nano-cellulose + PEI *[4] |
|  | Oxygen permeability*[5] (cc/m$^2$ · day · atm) | 0.26 | 0.35 | 0.40 | 0.20 | 0.30 | 0.11 | 0.07 | 0.43 |

*[1] Cellulose nanocrystal (derived from sulfuric acid decomposition)
*[2] 1-Ethyl-3-(3-diethylaminopropyl)carbodiimide hydrochloride
*[3] Sulfur trioxide-pyridine complex
*[4] Polyethyleneimine (coating amount: 0.6 g/m$^2$)
*[5] Oxygen permeability of product having nanocellulose coating amount of 1 g/m$^2$ (measured at 23° C. 0% RH)
*6) Sulfo group and/or sulfuric acid group (derived from sulfuric acid decomposition + hydrophilization treatment)
*7) Sulfo group and/or sulfuric acid group (derived from sulfuric acid decomposition) + phosphoric acid group (derived from hydrophilization treatment)
*8) Sulfo group and/or sulfuric acid group (derived from sulfuric acid decomposition) + carboxyl group (derived from hydrophilization treatment)
*9) Sulfo group and/or sulfuric acid group (derived from sulfuric acid decomposition)

INDUSTRIAL APPLICABILITY

Since the nanocellulose of the present invention has excellent gas-barrier properties and handleability, it is used as a coating agent capable of imparting gas-barrier properties. Further, since the product of the present invention comprises a mixture of nanocellulose and a polyvalent cationic resin, it can exhibit gas-barrier properties superior to those exhibited by nanocellulose alone. Therefore, the product of the present invention can be used suitably as a gas-barrier film. Furthermore, since the interfacial peeling strength to a hydrophobic substrate formed of a thermoplastic resin or the like is also improved, the product can be used suitably as a gas-barrier laminate.

The invention claimed is:

1. A product comprising a substrate and a layer of a mixture of polyethyleneimine and cellulose nanocrystal formed on the substrate, wherein the cellulose nanocrystal comprising a sulfuric acid group and/or a sulfo group each derived from a sulfuric acid treatment and an anionic functional group derived from a hydrophilization treatment, wherein the sulfuric acid group and/or the sulfo group and the anionic functional group are contained in a total amount of 0.3 to 1.3 mmol/g, and when the mixture contains the cellulose nanocrystal in an amount of 1.0 $g/m^2$, the polyethyleneimine is contained in an amount of 0.01 to 2.0 $g/m^2$.

2. The product according to claim 1, wherein the anionic functional group is at least one selected from the group consisting of a sulfuric acid group, a sulfo group, a phosphoric acid group, and a carboxyl group.

3. The product according to claim 1, comprising cellulose nanocrystal having a fiber width of not more than 50 nm and an aspect ratio in a range of 5 to 50, and/or cellulose nanofibers having a fiber width of not more than 50 nm and an aspect ratio of not less than 10.

4. The product according to claim 1, wherein the cellulose nanocrystal is produced by a method comprising:

subjecting cellulose nanocrystal that contains a sulfuric acid group and/or a sulfo group to a hydrophilization treatment, the cellulose nanocrystal being obtainable by subjecting a cellulose material to a sulfuric acid treatment.

5. The product according to claim 4, wherein the hydrophilization treatment is a treatment using any one of carbodiimide, sulfuric acid, a sulfur trioxide-pyridine complex, phosphoric acid-urea, a TEMPO catalyst, or an oxidant.

6. The product according to claim 1, wherein the cellulose nanocrystal has a self-organization structure.

7. The product according to claim 1 having a self-organization structure.

* * * * *